United States Patent [19]

Bayha et al.

[11] Patent Number: 4,694,211
[45] Date of Patent: Sep. 15, 1987

[54] SYSTEM FOR SUPPLYING FUEL INCLUDING PROTECTION AGAINST ELECTROLYTIC CORROSION

[75] Inventors: Heiner Bayha, Vaihingen; Hermann Kluge, Ingersheim; Horst Rachner, Bietigheim-Bissingen, all of Fed. Rep. of Germany

[73] Assignee: SWF Auto Electric GmbH, Bietigheim-Bissingen, Fed. Rep. of Germany

[21] Appl. No.: 870,100

[22] Filed: Jun. 3, 1986

[30] Foreign Application Priority Data

Jun. 26, 1985 [DE] Fed. Rep. of Germany ....... 3522835

[51] Int. Cl.4 .................... F04B 17/00; H02K 11/00
[52] U.S. Cl. .................... 310/71; 204/197; 310/72; 310/87; 417/366
[58] Field of Search ........... 123/497; 204/197, 148; 307/95; 310/43, 45, 71, 72, 87, 249; 324/29; 361/216-220, 222; 417/366, 368, 423 R

[56] References Cited

U.S. PATENT DOCUMENTS

| | | | |
|---|---|---|---|
| 3,098,991 | 7/1963 | Wolber | 307/95 |
| 3,515,654 | 6/1970 | Bordalen et al. | 204/197 |
| 3,676,025 | 7/1972 | Shultz et al. | 417/423 |
| 3,870,910 | 3/1975 | Füssner | 417/423 R |
| 3,969,044 | 7/1976 | Füssner et al. | 417/366 |
| 4,093,529 | 6/1978 | Strobach | 204/197 |
| 4,212,601 | 7/1980 | Ina | 417/366 |

Primary Examiner—Peter S. Wong
Assistant Examiner—D. L. Rebsch
Attorney, Agent, or Firm—James B. Raden; Donald J. Breh

[57] ABSTRACT

An system for the supply of fuel which acts as an electrolyte, including a metallic component part as a sacrificial anode for protection of metallic current leads against electrolytic corrosion. The component part is connected to the positive side of the operating circuit of the electric motor. In order to improve the protection of the current leads, the sacrificial anode is connected to a higher electric potential than the current lead for the positive side of the circuit.

10 Claims, 3 Drawing Figures

SYSTEM FOR SUPPLYING FUEL INCLUDING PROTECTION AGAINST ELECTROLYTIC CORROSION

BACKGROUND OF THE INVENTION

This invention relates to a fuel supply system which is especially used in motor vehicles.

A fuel supply system of this general kind is disclosed in the German specification No. OS 3,140,946. In that system a metallic component part connected with the positive side of the operating circuit of an electric motor of a pump is directly fitted onto the positive terminal of the electric motor. Although this arrangement protects the terminal against electrolytic material losses to a certain extent, there is no such protection of other leads located between the terminal and the carbon brush of the motor such as the particularly sensitive pigtails, principally because the geometrical arrangement between the metallic component part, which forms a sacrifical anode, and the other current leads is not favorable to providing such protection. If the carbon brush pigtails are protected, such as by arranging the sacrificial anode directly around them, protection of the other current leads connected to the positive side is adversely affected.

SUMMARY OF THE INVENTION

It is therefore an object of the invention to provide for a fuel supply system that protects the current leads of the pump motor connected to the positive side of the motor against material losses caused by the electrolytic properties of the fuel.

This object is achieved according to important feature of the invention which provide for a component part of the system to form a sacrificial anode connected to a higher electric potential than a current lead connected to the positive side of the electric motor. This feature provides less electrolytic material loss of the metallic current leads of the positive side of the operating circuit of the electric motor, so that the service life of the system is prolonged.

According to a preferred embodiment of the invention, a series resistor is inserted into the positive side of the operating circuit and the metallic component part is connected to the positive side in front of the series resistor. A short-circuit ring can be used as a metallic component part.

Another important feature of the invention provides for protection of the pigtail of the positive carbon brush by at least partially surrounding it with the component part.

According to another advantageous feature of the invention, there is fitted a further component part which screens a current lead which is part of the negative side and which is connected to a higher electric potential than the negative current lead.

A still further important feature of the invention provides for an increase in the electric resistance between the positive and negative sides of the electrolyte in the vicinity of the commutator by dividing the housing interior into a positive and a negative chamber with partitions.

Another feature of the invention also provides for an armature including a shaft, a laminated core and a commutator fitted on the shaft, and windings connected with the segments of the commutator, which has the windings surrounded as far as to the connection points on the commutator with a material which is resistant to the corrosive and electrolytic effect of the fuel. The windings are thereby also protected against electrolytic material losses.

BRIEF DESCRIPTION OF THE DRAWINGS

The invention will be better understood after a reading of the Detailed Description in conjunction with the accompanying drawings in which.

DETAILED DESCRIPTION OF THE PREFERRED EMBODIMENT

Figure 1:
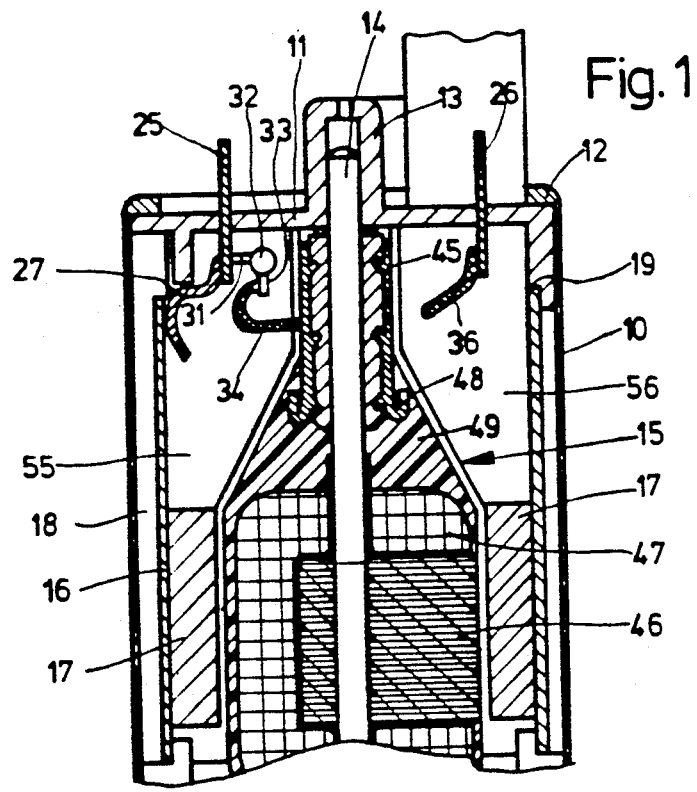
FIG. 1 is a longitudinal section through a fuel supply system according to the invention, showing the short-circuit ring of the permanent magnets connected to a higher electric potential than the pigtails of the carbon brushes of the positive side.

In FIG. 1 only part of a direct current motor is shown which together with a pump unit, not shown in the drawing, forms the electric fuel supply system. A cylindrical sheet metal housing 10 encloses the electric motor and the pump unit. At its one front face the sheet metal housing 10 is closed by a plastic cover 11, which it encompasses with flange 12. The cover 11 has a central cylinder bearing 13 for a shaft 14 of an armature 15 of the electric motor. Between the armature 15 and the sheet metal housing 10, there is arranged a metallic short-circuit ring 16, which carries two permanent magnets 17. Between the short-circuit ring 16 and the sheet metal housing 10 there is an intermediate space 18. The cover 11 is held between one front side 19 of the short-circuit ring 16 and the flange 12.

Two electric connection parts 25 and 26, which are formed as flat-pin terminals, extend through the cover 11. During operation, the connection part 25 is connected with the positive pole and the connection part 26 with the negative pole of a voltage source, In addition, there is fitted a resilient contact member 27 by way of which the short-circuit ring 16 is connected in an electrically conductive manner with the flat-pin terminal 25. The contact member 27 is a separate metal spring which has its one end welded onto a portion of the flat-pin terminal 25 protruding to its inside. The end so welded on runs in the direction of the flat-pin terminal 25. The other end of the contact member 27 rests resiliently upon the inner short-circuit ring 16. Thus, when the fuel supply system is connected to the electric network of a motor vehicle, the short-circuit ring 16 is connected to a voltage souce of the electric network.

In addition to the contact member 27, a connecting wire 31 of an electric resistor 32 is fixed on the flat-pin terminal 25. The other connecting wire 33 of the resistor 32 is connected to the pigtail of the carbon brush 35 associated with the positive side of the electric motor.

Figure 2:
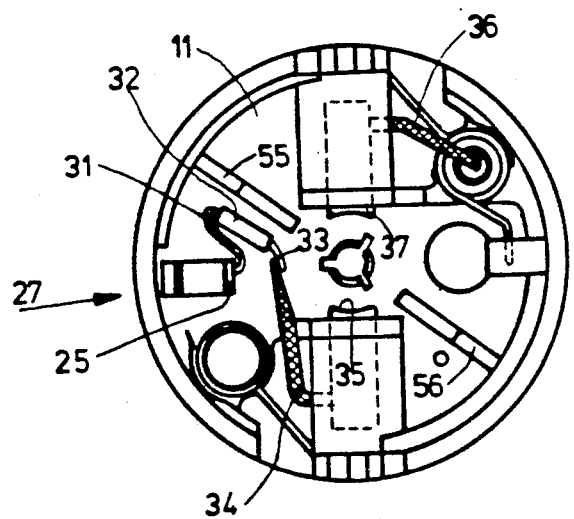
FIG. 2 is a view of the housing cover inside showing details of the components.
Figure 3:
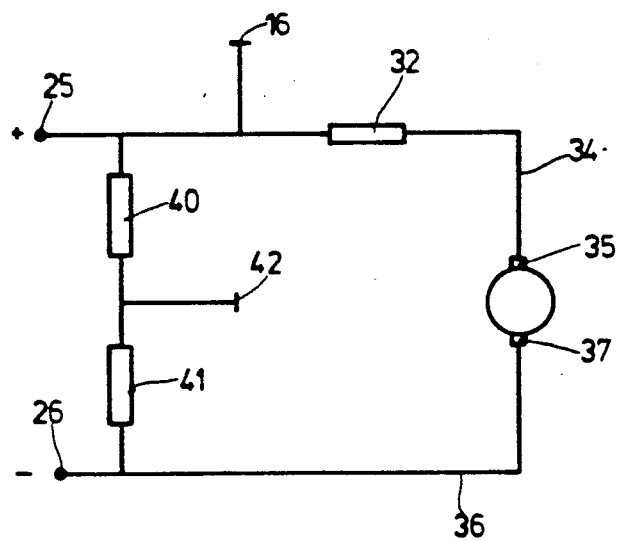
FIG. 3 is a circuit diagram for a fuel supply system having two sacrificial anodes.

As can be seen from the circuit arrangement according to FIG. 3, in which the electric components of FIGS. 1 and 2 are shown schematically, the resistor 32, which represents a series resistor, has the effect that short-circuit ring 16, which is used as a sacrificial anode, is connected to a higher electric potential than the pigtail 34. The pigtail 34, which otherwise could particularly be damaged by electrolytic material losses, is especially well protected.

The pigtail 36 pertaining to the negative side is fitted on a portion of the flat-pin terminal 26 protruding into the housing interior. The pigtail 36 is connected from the flat-pin terminal 26 to the carbon brush 37. As FIG. 3 shows, the pigtail 36 can also be protected by a component part 42 connected to a higher electric potential than itself. For this purpose the flat-pin terminal 25 and the flat-pin terminal 26 are directly interconnected via a voltage divider consisting of the two resistors 40 and 41. For the component part 42 a material is used which is less costly than copper, e.g. zinc. The short-circuit ring 16 is also preferably made of a material less costly than copper, e.g. galvanized iron.

The metallic component part 42 can, for example, be a sheet metal which partially surrounds the pigtail 36. Accordingly, the pigtail 34 can also be surrounded by a sheet metal.

The armature 15 of the electric motor shown has, in addition to the armature shaft 14 and the commutator 45, a laminated core 46 and windings 47. The individual windings are connected with hook-shaped portions 48 of the individual commutator segments. In order to protect the material of the windings against material losses caused by electrolytic current, the windings are surrounded as far as to the hook-shaped portions 48 on the commutator by a plastic material 49 which is resistant to corrosion and electrolytic action of the fuel.

As a further measure of protection of the current leads, the housing interior is divided into a positive and a negative chamber by partitions 55 and 56 in the vicinity of the commutator 45. The partitions 55 and 56 extend closely to the commutator 45 and the plastic material 49. By providing longer current leads with a smaller cross-section, the current through the electrolyte is reduced as is the electrolytic transport of material. In the example shown, there are two partitions. However, there can also be provided more than two partitions if desired.

What is claimed is:

1. A system for supplying a fuel in a motor vehicle including an electric motor driving a supply pump said motor and said pump mounted in a housing, comprising a metallic component part in said housing carrying a pair of permanent magnets, stationarily arranged metallic current leads adapted to be connected to an external electrical operating circuit, said metallic component part electrically connected to a positive side of the operating circuit of the electric motor, and means providing for a higher electric potential at said metallic component part than at one of said current leads connected to the positve side of said motor.

2. A system according to claim 1, wherein said means providing for higher electric potential includes a resistor connected in the positive side of the operating circuit in series with said motor and the component part is connected to the positive side between said resistor and a positive one of said stationary current leads 3. A system according to claim 1, wherein said metallic component part is a short-circuit ring.

4. A system according to claim 1, wherein a pigtail of a carbon brush of said motor is at least partially surrounded by said component part.

5. A system according to claim 4, wherein the component part is a sheet metal part surrounding the pigtail.

6. A system according to claim 1 further comprising, a further component part screening a lead from said motor to a negative one of said stationary current leads and means providing for reducing the electric potential of said lead from said motor below the electric potential of said further component part.

7. A system according to claim 6, wherein a positive one and said negative one of said stationary supply leads are electrically interconnected via a voltage divider; network and the further component part picks up a voltage from the voltage divider network.

8. A system according to claim 1 further comprising, at least two partitions in said housing dividing the housing into a positive chamber and a negative chamber.

9. A system according to claim 1, wherein said motor includes an armature having a shaft, a laminated core and a commutator, said core and said commutator fitted on the shaft, said armature further including windings connected with segments of the commutator and surrounded by material resistant against chemical and electrolytic effects of said fuel.

10. A system for supplying a fuel in a motor vehicle including an electric motor during a supply pump said motor and said pump mounted in a housing, comprising a metallic component part in said housing carrying a pair of permanent magnets, a positive current lead and a negative current lead adapted to be connected to an external electrical operating circuit, said metallic component part electrically connected to a positive side of the operating circuit, means providing for a higher electric potential of said metallic component part than at said positive current lead connected to the positive side of said motor, a further component part screening said negative current lead, and said positive current lead and said negative current lead interconnected by a voltage divider network, said further component part being at an electric potential less than that at said negative current lead connected to the negative side of said motor.

* * * * *